United States Patent [19]

Inoue

[11] 4,424,433

[45] Jan. 3, 1984

[54] METHOD AND APPARATUS FOR ELECTRICALLY MACHINING A CONDUCTIVE WORKPIECE WITH ISOTROPIC ULTRASONIC-WAVES RADIATION

[75] Inventor: Kiyoshi Inoue, Tokyo, Japan

[73] Assignee: Inoue-Japax Research Incorporated, Yokohama, Japan

[21] Appl. No.: 262,932

[22] Filed: May 12, 1981

Related U.S. Application Data

[63] Continuation-in-part of Ser. No. 202,232, Oct. 30, 1980, Pat. No. 4,408,113, which is a continuation-in-part of Ser. No. 222,763, Jan. 6, 1981, Pat. No. 4,386,256, which is a continuation-in-part of Ser. No. 226,417, Jan. 19, 1981, Pat. No. 4,379,960.

[30] Foreign Application Priority Data

May 15, 1980 [JP] Japan .................................. 55-64469

[51] Int. Cl.³ .............................................. B23P 1/12
[52] U.S. Cl. .............................. 219/69 W; 219/69 M; 219/69 V; 204/129.7
[58] Field of Search ............... 219/69 V, 69 M, 69 G, 219/69 R, 69 D, 68; 204/129.6, 129.7

[56] References Cited

U.S. PATENT DOCUMENTS 4,205,213  5/1980  Inoue ................................ 219/69 V

FOREIGN PATENT DOCUMENTS 276823   4/1964  Australia ......................... 219/69 D
846971   9/1960  United Kingdom .
1105411  3/1968  United Kingdom .
1372446  10/1974 United Kingdom .
1511482  5/1978  United Kingdom .

OTHER PUBLICATIONS

"A Textbook of Sound" by A. B. Wood, pp. 154–155.
"Ultra Sonics" by Carbin, pp. 104–105.

*Primary Examiner*—M. H. Paschall
*Attorney, Agent, or Firm*—Karl F. Ross; Herbert Dubno

[57] ABSTRACT

An improved method of and apparatus for electrically machining a workpiece wherein the machining surface of an electrode is spacedly juxtaposed with the workpiece and supplied with a machining liquid. The liquid is carried into a machining gap between the electrode and the workpiece and a wave-emitting member with a continuous annular vibrant surface is disposed adjacent to the workpiece whereby to position the said surface to spacedly surround the electrode. Ultrasonic waves are produced with this surface by virtue of a mechanical vibratory activation of the member by a transducer and such waves are emitted against at least a portion of the machining electrode surface isotropically whereby to effect a uniform activation of the electrode surface and the machining liquid medium on the latter in the machining zone.

6 Claims, 7 Drawing Figures

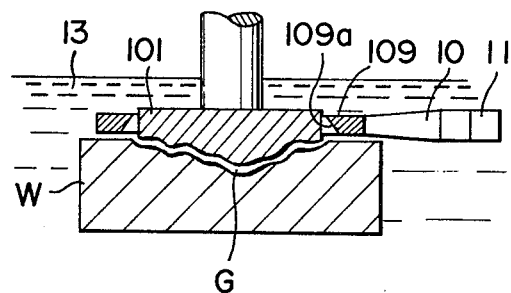
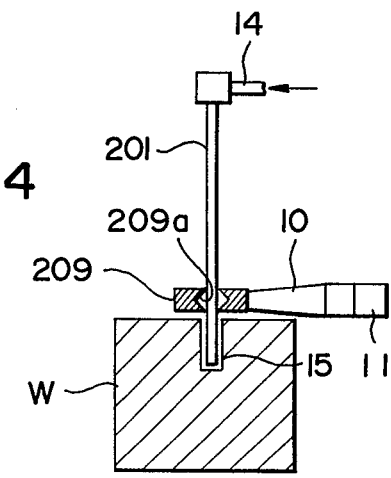
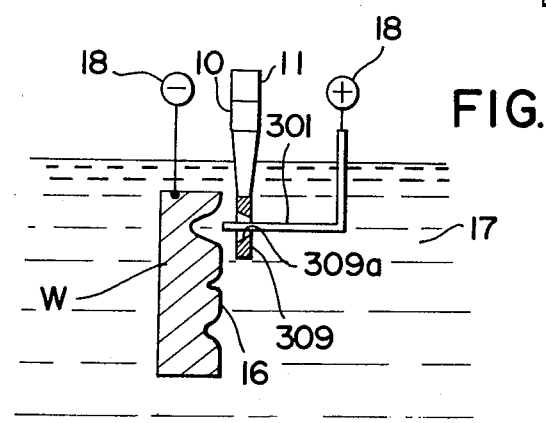

METHOD AND APPARATUS FOR ELECTRICALLY MACHINING A CONDUCTIVE WORKPIECE WITH ISOTROPIC ULTRASONIC-WAVES RADIATION

CROSS-REFERENCE TO RELATED APPLICATIONS

This application is a continuation-in-part and discloses and claims subject matter disclosed in my copending U.S. Pat. applications: Ser. No. 202,232 now U.S. Pat. No. 4,408,113 filed Oct. 30, 1980 which is a continuation-in-part of Ser. No. 222,763 now U.S. Pat. No. 4,386,256 filed Jan. 6, 1981 which is a continuation-in-part of Ser. No. 226,417 now U.S. Pat. No. 4,379,960 filed Jan. 19, 1981.

FIELD OF THE INVENTION

The present invention relates generally to electrical machining and, in particular, to a new and useful method of and apparatus for machining a conductive workpiece with a conductive electrode, wherein ultrasonic waves are applied in a novel manner to the region of the electrode such as to achieve an enhanced machining rate.

The terms "electrical machining", "electrically machining" and "to electrically machine" are used herein to refer to the general genre of machining techniques where an electric current is passed between an electrode and a workpiece constituting a counterelectrode through a liquid-filled machining gap to act on the workpiece by electroerosively removing material from the workpiece, by electrically or electrolytically adding material from an electrolyte onto the workpiece or by electrically heat-treating the surface of the workpiece. Typical methods of electrical machining include electrical discharge machining (EDM), electrochemical machining (ECM), electrochemical-discharge machining (ECDM) with a shaped or solid electrode or with a continuous wire or like electrode, electrodepositing and electrolytic (discharge) heating.

BACKGROUND OF THE INVENTION

In the aforementioned applications it has been pointed out that radiation of ultrasonic waves to the region of an electrical machining gap formed between an electrode and a workpiece generally results in an improvement in machining efficiency and performance. These applications thus disclose one or more wave emitters immersed in a liquid machining medium and located at a given distance from the region of the machining gap. The ultrasonic waves produced at each emitter propagate through the liquid medium and are capable of penetrating through barrier layers which normally exist adjacent to the electrode surface to bring the latter into a highly activated state. Dynamic phenomena are thus created in the gap site to agitate or move randomly the machining liquid and ions and machining products therein to promote removal of the gap detritus and to allow continuous renewal of the machining medium in the gap site. This has been shown to give rise to an increase in machining rate and an improved machining performance. In the systems earlier proposed to seek advantages of the ultrasonic radiation, however, the waves are radiated from a single lateral proximity or two or more mutually distant locations spaced from the gap site. As a result, a large region or regions of stagnancy not subject to the radiation always exist on the electrode surface. The gap contaminants thus tend to build up at these regions and there tends to develop an arc or short-circuiting condition which impedes the achievement of the desired effects.

OBJECT OF THE INVENTION

It is, therefore, an important object of the present invention to provide an improved electrical machining method utilizing ultrasonic waves wherein the radiation of ultrasonic waves is carried out in an optimum manner to achieve a much enhanced machining rate and performance.

Another important object of the invention is to provide an electrical machining apparatus including a highly efficient ultrasonic radiation means which is capable of achieving machining efficiency and results much improved over the prior art.

Other objects of the invention will become apparent as the following, description proceeds.

SUMMARY OF THE INVENTION

In accordance with the present invention there is provided in a first aspect thereof a method of electrically machining a conductive workpiece wherein the machining surface of an electrode is spacedly juxtaposed with the workpiece and supplied with a liquid machining medium to define a liquid filled machining gap therebetween and a machining electric current is passed between the electrode and the workpiece to electrically machine the latter across the gap, which method comprises: positioning a continuous annular vibrant wave-emitting surface to spacedly surround the electrode; and producing ultrasonic waves with the vibrant surface by a mechanical vibratory activation thereof and applying the ultrasonic waves to at least a portion of the machining electrode surface substantially isotropically from the continuous annular wave-emitting surface.

The invention also provides, in a second aspect thereof, an apparatus for electrically machining a conductive workpiece with a machining electrode, having means for supporting the electrode to bring its machining surface in a spaced juxtaposition with the workpiece to define a machining gap therebetween, means for supplying a liquid machining medium on the machining electrode surface and to the machining gap and means for passing a machining electric current between the electrode and the workpiece to electrically machine the latter across the gap, which apparatus also comprises a ring-shaped member having a continuous annular wave-emitting surface and adapted to be disposed to position the said annular surface so as to spacedly surround the electrode; and means for producing ultrasonic waves with the said member by generating a mechanical vibration of ultrasonic frequency therein and applying the ultrasonic waves to at least a portion of the machining electrode surface substantially isotropically from the continuous annular wave-emitting surface.

BRIEF DESCRIPTION OF THE DRAWING

These and other features as well as advantages of the present invention will more readily be understood from the following description of certain preferred embodiments thereof as taken with reference to the accompanying drawing in which:

FIG. 3 is an elevational-sectional view diagrammatically illustrating an apparatus of the invention as embodied in a sinkingtype electroerosion machining system or electrodeposition system;

FIG. 4 is a similar view diagrammatically illustrating an apparatus of the invention as embodied in a deep-hole electroerosion system or electrodeposition system; and FIG. 5 is a similar view diagrammatically illustrating an apparatus of the invention as embodied in a system for electrodepositing or electrolytic (discharge) heating a metallic surface with intricate contours.

SPECIFIC DESCRIPTION

Figure 1:
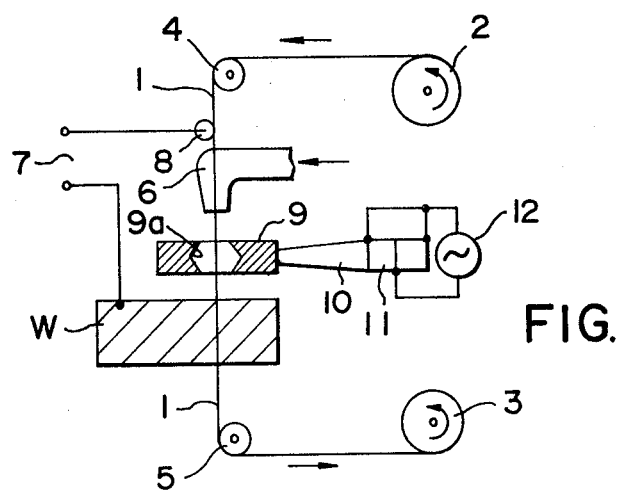
FIG. 1 is a schematic elevational view essentially in section diagrammatically illustrating an apparatus of the invention as embodied in a wire-cut electroerosion machining system.

The principles of the present invention are applicable with particular advantages to a wire-cut electroerosion machining system schematically as shown in FIG. 1. In this system, the machining electrode is constituted as a continuous wire or like elongated body 1. The wire electrode 1, which may be composed of, for example, copper or brass and be of a thickness of 0.05 to 0.5 mm, is continuously transported between a supply side 2 shown by a supply reel and a collection site 3 shown by a takeup reel. In the path of wire travel, a pair of guide members 4 and 5 are provided to change the wire-traveling direction from the suply side 2 to the region of a workpiece W and from the latter region to the collection side 3, respectively. A combination of drive rollers and brake rollers (both of which are not shown) customarily provided in the wire travel path determines a desired rate of wire axial travel and a desired tension applied on the running wire electrode. The guide members 4 and 5 may be used to bring the axis of the wire electrode 1 therebetween into a spaced machining juxtaposition with the workpiece W traversed linearly by the wire electrode 1.

A machining liquid medium, e.g. distilled water furnished by ion-exchanging water from a municipal water supply, is supplied by a nozzle 6 onto the traveling wire electrode 1 and carried thereon into the machining gap in the workpiece W. A conventional electroerosion power supply 7 has one output terminal electrically connected to the wire electrode 1 via a brush 8 and the other output terminal electrically connected to the workpiece W via a conductor (not shown) to pass a machining electric current, typically or preferably in the form of a succession of pulses, between the wire electrode 1 and the workpiece W through the liquid flooded gap, thereby electroerosively removing material from the workpiece W. As material removal proceeds, the workpiece W is displaced transversely to the axis of the wire electrode 1 along a prescribed path to form a desired contour in the workpiece W.

In accordance with the present invention, a ring-shaped vibrant member 9 is disposed with its inner continuous annular surface 9a spacedly surrounding the wire electrode 1 at a region upstream of and adjacent to the workpiece W. In the embodiment shown, the member 9 is composed of vibratile metal or alloy and has the constricted end tip of a conventional ultrasonic horn 10 in contact therewith. The horn 10 is in turn coupled with an electromechanical transducer 11, e.g. quartz, which is energized by a high-frequency power supply 12 to induce a mechanical vibration output therein. The vibratory signal is amplified in a usual manner by the horn 10 and transmitted therefrom to the member 9 in accordance with the invention. The continuous annular surface 9a of the member 9 is preferably equi-distantly spaced from the circular periphery of the wire electrode 1. The result is that the wire electrode 1 undergoes isotropic radiation by the ultrasonic waves emitted from the member 9; the ultrasonic waves are focussed on the axis of the wire electrode 1 and isotropically act on the surface of the wire electrode 1 in any and/or every plane orthogonal to the axis thereof in the region surrounded by member 9. The consequence is therefore the uniform stripping and removal of contaminants and adherent gases from the surface of the wire electrode, thus permitting the liquid machining medium supplied by the nozzle 6 to be freed from gaseous entrainment and to be led into the machining zone between the wire electrode and the workpiece W with an increased improved wetting characteristic. Furthermore, reflections and deflections of a portion of the ultrasonic waves propagate through the liquid machining medium and act on the machining zone to allow a greater amount of the medium to be replenished in the narrow machining gap, thereby facilitating removal of machining chips, gases and detritus therein. Since the ultrasonic waves are applied isotropically to the wire electrode, there develops practically no region of stagnancy of the liquid machining medium carried by the wire electrode over the entire circular or cylindrical periphery thereof. The entire area of the machining gap is thus allowed to be furnished uniformly with the machining liquid medium in a greater amount to promote gap decontamination. This on one hand produces an enhanced action of cooling the wire electrode and the workpiece and on the other hand effectively prevents them from short-circuiting or arcing. Because of this enhanced cooling action and impediment of gap short-circuiting and arcing, the wire becomes less liable breakage and greater stability of machining ensues to allow an increase removal rate. It has been found that a removal (machining) rate increased up to 30 to 100% over the prior art is obtained.

Figure 2A:
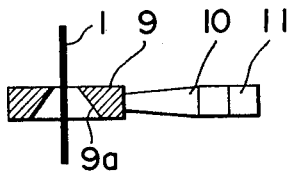
FIGS. 2(A), 2(B) and 2(C) are elevational sectional views of annular ultrasonic-vibrant plate members with annular wave-emitting surfaces shaped with different contours for use with the system of FIG. 1 and those of subsequent FIGURES.
Figure 2B:
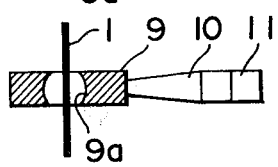
Figure 2C:
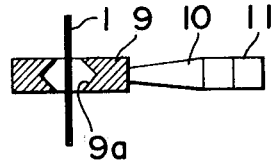

FIGS. 2(A), 2(B) and 2(C) show typical embodiments of the continuous annular surface 9a of the vibrant member 9 which emits the ultrasonic waves isotropically against the wire electrode 1. The surface 9a of FIG. 2(A) is conically tapered to diverge towards the region of the workpiece. The surface 9a of FIG. 2(B) is shaped to be parabolic. The surface 9a of FIG. 2(C) consists of an upper portion conically tapered to converge upwards and a lower portion conically tapered to converge downwards.

FIG. 3 shows an electroerosion machining (EDM, ECM or ECDM) system or electrodeposition system wherein a shaped electrode 101 is spacedly juxtaposed with a workpiece W in a liquid machining medium 13 and, in accordance with the present invention, is encircled with the inner continuous annular surface 109a of a wave-emitting vibrant member 109 ultrasonically vibrated via the horn 10 by the electromechanical transducer 11 shown previously. The surface 109a is shaped with a contour as shown in FIG. 2(A) to direct the ultrasonic waves towards the electrode 101 and effectively towards the total area of machining gap G. With such an electrode of greater and intricate machining surface as shown, it has been difficult to remove the machining chips, gases and detritus satisfactorily but it becomes possible to achieve this, in accordance with the invention, by subjecting the total electrode machining surface and gap area to isotropic radiation by ultrasonic waves and thus to allow machining to proceed with an increased machining stability uniform over the entire area for enhancement of the removal or deposition rate. It has been found that an increase up to 30% in removal or deposition rate over the prior art is readily obtained.

In a small-hole electroerosion machining or electrodeposition system as shown in FIG. 4, a tubular electrode 201 is furnished through its internal bore with a liquid machining medium supplied from a supply conduit 14 and is spacedly juxtaposed with a workpiece W to electroerosively form a small and deep cavity 15 therein or to electrolytically deposit a uniform coating on the small and deep cavity 15 formed in the workpiece W. In this system as well, a wave-emitting vibrant member 209 ultrasonically vibrated via the horn 10 by the electromechanical transducer 11 is disposed adjacent to the opening of the cavity 15 to position its inner continuous annular surface 209a so as to equi-spacedly surround the tubular electrode 201 and to apply an isotoropic radiation of the ultrasonic waves to the electrode 201. In this manner, it has been found that an increase up to 200% in removal or deposition rate over the prior art is readily obtained.

In an electrodeposition (e.g. coating or forming) or electrolytic (discharge) heating system as shown in FIG. 5, a rod or needle electrode 301 is spacedly juxtaposed with an intricate contour 16 of a workpiece W immersed in a liquid electrolyte 17 while the electrode 301 and the workpiece W are energized by a power supply 18 to electrolytically deposit a layer of metal from the electrolyte on a portion of the contour 16 or to locally heat a portion of the contour 16 by the action of electrolytic discharges. One of the electrode 301 and the workpiece W is displaced to allow the machining tip portion of the electrode 301 to sweep over the entire area of the contour 16 of the workpiece W so that a uniform deposition or heated layer develops over the entire area of contour 16. In this system, too, a wave-emitting vibrant member 309 ultrasonically vibrated via the horn 10 by the electromechanical transducer 11 is disposed adjacent to the workpiece W to position its inner continuous annular surface 309a so as to equi-distantly surround the rod or needle electrode 301 to apply an isotropic radiation of the ultrasonic waves to the electrode 301 and the machining zone. This causes a highly uniform agitation of the electrolyte in the region of the machining tip portion of the electrode 301 to allow a deposited or hardened layer to build up with an increased uniformity and rate of deposition or hardening.

What is claimed is:

1. In a method of electrically machining a conductive workpiece wherein the machining surface of an electrode is spacedly juxtaposed with the workpiece and supplied with a machining liquid medium to define a liquid filled machining gap therebetween and a machining electric current is passed between the electrode and the workpiece to electrically machine the latter across the gap, the improvement which comprises the steps of:

positioning a circumferentially continuous annular vibrant wave-emitting surface of an emitting member independent of said workpiece so as to spacedly surround said electrode and to be spaced from the workpiece; and producing ultrasonic waves with said surface by vibrationally activating the same, and propagating said ultrasonic waves onto at least a portion of said machining electrode surface substantially isotropically from said continuous annular waveemitting surface.

2. The improvement defined in claim 1 wherein said annular surface is equi-distantly spaced from said portion in a plane perpendicular to the axis of said electrode.

3. The improvement defined in claim 2 wherein said annular surface is contoured with a shape adapted to focus said ultrasonic waves at the region of said portion.

4. In an apparatus for electrically machining a conductive workpiece with a machining electrode, having means for supporting the electrode to bring its machining surface in a spaced juxtaposition with the workpiece to define machining gap therebetween, means for supplying a machining liquid medium on the machining electrode surface and to the machining gap and means for passing a machining electric current between the electrode and the workpiece to electrically machine the latter across the liquid-filled machining gap, the improvement which comprises:

a ring-shaped member independent of said workpiece having a circumferentially continuous annular wave-emitting surface spacedly surrounding said electrode and spaced from said workpiece; and means for producing ultrasonic waves with said surface by generating a mechanical vibration of ultrasonic frequency in said member, and applying said ultrasonic waves to at least a portion of said machining electrode surface substantially isotropically from said continuous annular wave-emitting surface.

5. The improvement defined in claim 4 wherein said annular surface is equi-distantly spaced from said portion in a plane perpendicular to the axis of said electrode.

6. The improvement defined in claim 5 wherein said annular surface is contoured with a shape adapted to focus said ultrasonic waves at the region of said portion.

* * * * *